US006920533B2

(12) United States Patent
Coulson et al.

(10) Patent No.: US 6,920,533 B2
(45) Date of Patent: Jul. 19, 2005

(54) SYSTEM BOOT TIME REDUCTION METHOD

(75) Inventors: Richard L. Coulson, Portland, OR (US); John I. Garney, Portland, OR (US); Jeanna N. Matthews, Massena, NY (US); Robert J. Royer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 09/894,310

(22) Filed: Jun. 27, 2001

(65) Prior Publication Data

US 2003/0005223 A1 Jan. 2, 2003

(51) Int. Cl.⁷ .......................... G06F 12/14; G06F 12/16
(52) U.S. Cl. .......................... 711/145; 711/118; 713/1; 713/2
(58) Field of Search .......................... 711/145

(56) References Cited

U.S. PATENT DOCUMENTS

| 5,586,291 A | 12/1996 | Lasker et al. | |
|---|---|---|---|
| 5,636,355 A | 6/1997 | Ramakrishnan et al. | |
| 5,758,149 A | * 5/1998 | Bierma et al. | 707/8 |
| 5,761,678 A | 6/1998 | Bendert et al. | |

(Continued)

FOREIGN PATENT DOCUMENTS

| EP | 0210384 | 4/1987 |
|---|---|---|
| EP | 0 702 305 A1 | 3/1996 |
| GB | 2210480 A | 7/1989 |
| WO | WO 02/01365 A2 | 1/2002 |

OTHER PUBLICATIONS

Microsoft Computer Dicitionary, Copiright 1999, Microsoft Press, Fourth Edition, 58–59 and 235.*
PCT Search Report, dated Nov. 14, 2002.
Pending U.S. Appl. No. 09/945,266, Richard Coulson, filed Aug. 31, 2001.
Pending U.S. Appl. No. 09/895,578, Royer et al., filed Jun. 29, 2001.
Pending U.S. Appl. No. 10/026,398, Royer et al., filed Dec. 21, 2001.
Pending U.S. Appl. No. 09/602,011, filed Jun. 23, 2003 to Richard Coulson,: Non–Volatile Cache Integrated with Storage Devices.
Pending U.S. Appl. No. 09/669, 770, filed Sep. 26, 2000, to Richard Coulson, "Non–Volatile Mass Storage Cache Coherency Administrator".
Pending U.S. Appl. No. 09/602,008, filed Jun. 23, 2000, to Richard Coulson, "In–Line Cache".
Pending U.S. Appl. No. 09/602,009, filed Jun. 23, 2000, to Richard Coulson, "Non–Volatile Cache Expansion Board".
Jack Robertson, Silison Strategies, "Hyundai enters Japanese–dominated FeRAM Market", Sep. 3, 1998.
EEdesign, "Ramtron boosts serial FRAM density to 64 Kbits", Oct. 6, 1999.

(Continued)

*Primary Examiner*—Mano Padmanabhan
*Assistant Examiner*—Midys Inoa
(74) *Attorney, Agent, or Firm*—Trop, Pruner & Hu, P.C.

(57) ABSTRACT

A system and method to reduce the time for system initializations is disclosed. In accordance with the invention, data accessed during a system initialization is loaded into a non-volatile cache and is pinned to prevent eviction. By pinning data into the cache, the data required for system initialization is pre-loaded into the cache on a system reboot, thereby eliminating the need to access a disk.

40 Claims, 4 Drawing Sheets

U.S. PATENT DOCUMENTS

| | | | | |
|---|---|---|---|---|
| 5,913,224 A | | 6/1999 | MacDonald | |
| 5,974,508 A | | 10/1999 | Maheshwari | |
| 5,983,310 A | | 11/1999 | Adams | |
| 6,044,478 A | * | 3/2000 | Green | 714/42 |
| 6,119,118 A | | 9/2000 | Kain, III et al. | |
| 6,240,416 B1 | | 5/2001 | Immon et al. | |
| 6,295,538 B1 | | 9/2001 | Cooper et al. | |
| 6,298,130 B1 | | 10/2001 | Galvin | |
| 6,370,614 B1 | | 4/2002 | Teoman et al. | |
| 6,463,509 B1 | * | 10/2002 | Teoman et al. | 711/137 |
| 2001/0043784 A1 | * | 11/2001 | Shirata et al. | 386/21 |
| 2002/0174370 A1 | * | 11/2002 | Berstis | 713/300 |
| 2003/0005219 A1 | | 1/2003 | Royer, Jr. et al. | |
| 2003/0046493 A1 | | 3/2003 | Coulson | |
| 2003/0061436 A1 | | 3/2003 | Royer, Jr. et al. | |
| 2003/0074524 A1 | | 4/2003 | Coulson | |
| 2003/0120868 A1 | | 6/2003 | Royer, Jr. et al. | |
| 2003/0188123 A1 | | 10/2003 | Royer, Jr. et al. | |
| 2003/0188251 A1 | | 10/2003 | Brown et al. | |

OTHER PUBLICATIONS

Ramtron International Corp., data sheet, "The FRAM Technology", Jan. 1994.

Ramtron International Corp., data sheet "Preliminary—FM24C64 64Kb FRAM Serial Memory", Dec. 7, 1999.

Ramtron International Corp., data sheet "Preliminary—FM1608 64Kb Bytewide FRAM Memory", Dec. 7, 1999.

W. Merz et al., Bell Laboratories Record, "Ferroelectric Storage Devices", Sep. 1955.

O. Auciello et al., Physics Today, "The Physics of Ferroelectric Memories", Jul. 1998.

C. F. Pulvarti, The Catholic University of America, IRE Transaction—Component Parts, "Ferroelectrics and their Memory Applications", 1956.

J.L. Hennessy et al., "Computer Architecture: A Quantitive Approach" 3rd Edition, 2003, pp. 454–457 and pp. 689–692.

* cited by examiner

SYSTEM BOOT TIME REDUCTION METHOD

FIELD

The invention relates to operating systems, and more particularly, to a non-volatile cache used in a system.

BACKGROUND DESCRIPTION

The use of a cache with a processor reduces memory access time and increases the overall speed of a device. Typically, a cache is an area of memory which serves as a temporary storage area for a device. Data frequently accessed by the processor remain in the cache after an initial access and subsequent accesses to the same data may be made to the cache.

Two types of caching are commonly used, memory caching and disk caching. A memory cache, sometimes known as cache store, is typically a high-speed memory device such as a static random access memory (SRAM). Memory caching is effective because most programs access the same data or instructions repeatedly.

Disk caching works under the same principle as the memory caching but uses a conventional memory device such as a dynamic random access memory (DRAM). The most recently accessed data from the disk is stored in the disk cache. When a program needs to access the data from the disk, the disk cache is first checked to see if the data is in the disk cache. Disk caching can significantly improve the performance of applications because accessing a byte of data in RAM can be much faster than accessing a byte on a disk. For example, a sequence of disk accesses required to load an operating system and launch system services is predictable. As a result, this initialization data can be brought into a disk cache during normal operation for faster access.

However, the memory size of a cache is limited and is generally used to store the most recently used data. Therefore, when the cache becomes full, existing lines of data stored in the cache are replaced or de-allocated to make room for newly requested lines of data. The most commonly used cache replacement is the least recently used (LRU) algorithm by which the oldest (least recently used) memory line is evicted.

Although the replacement process generally does not cause problems, replacement of certain types of data can be detrimental. Accordingly, ways to solve some of the problems that can be caused by the replacement algorithm have been suggested in the related art. For example, U.S. Pat. No. 5,913,224 entitled "Programmable Cache Including a Non-Lockable Data Way and a Lockable Data Way Configured To Lock Real-Time Data" and U.S. Pat. No. 5,974,508 entitled "Cache Memory System and Method For Automatically Locking Cache Entries To Prevent Selected Memory Items From Being Replaced" disclose a method to lock the contents of time-critical data in a volatile cache memory to prevent eviction during normal operation.

However, for the type of the data necessary during a system initialization, locking the initialization data into a volatile cache memory would not make the data available when required as the information would be lost between system boots or power cycling of the system.

BRIEF DESCRIPTION OF THE DRAWINGS

The invention will be described in detail with reference to the following drawings in which like reference numerals refer to like elements wherein.

DETAILED DESCRIPTION

In the following description, specific details are given to provide a thorough understanding of the invention. For example, some circuits are shown in block diagram in order not to obscure the present invention in unnecessary detail. However, it will be understood by those skilled in the art that the present invention may be practiced without such specific details.

As disclosed herein, a "cache" refers to a temporary storage area and may be either a memory cache or disk cache. The term "data" refers to both data and instructions that can be stored in a cache. A "disk" refers to a hard disk drive, a floppy disk drive, a compact disc (CD) drive or any other magnetic or optical memory device for mass storage of data. The term "system initialization" refers both to a system boot when the power is first turned on, known as cold booting and a system reboot when a system is restarted, known as warm booting. For purposes of the explanation, system boot and system reboot will be used interchangeably. The term "computer readable medium" includes, but is not limited to portable or fixed storage devices, optical storage devices, and any other memory devices capable of storing computer instructions and/or data. The term "computer instructions" are software or firmware including data, codes, and programs that may be read and/or executed to perform certain tasks.

Generally, the invention provides a system and method to retain in a non-volatile storage media the data expected to be needed during a system initialization. The time required to reload an operating system and restart system services is a visible source of irritation to users. However, much of this time is devoted to reading the necessary data from a disk. Since the sequence of data read from a disk during system start-up or initiation is repeatable and can be predicted, the initialization time is reduced by having the data necessary for system initialization pre-loaded into a cache.

In particular, the data accessed during initialization (hereinafter "necessary data") is loaded into a non-volatile cache and marked or "pinned" to prevent eviction. Accordingly, the necessary data would be resident in the cache for fast access during system initialization even following an unexpected system shutdown, thereby avoiding accesses to the disk.

Figure 1:
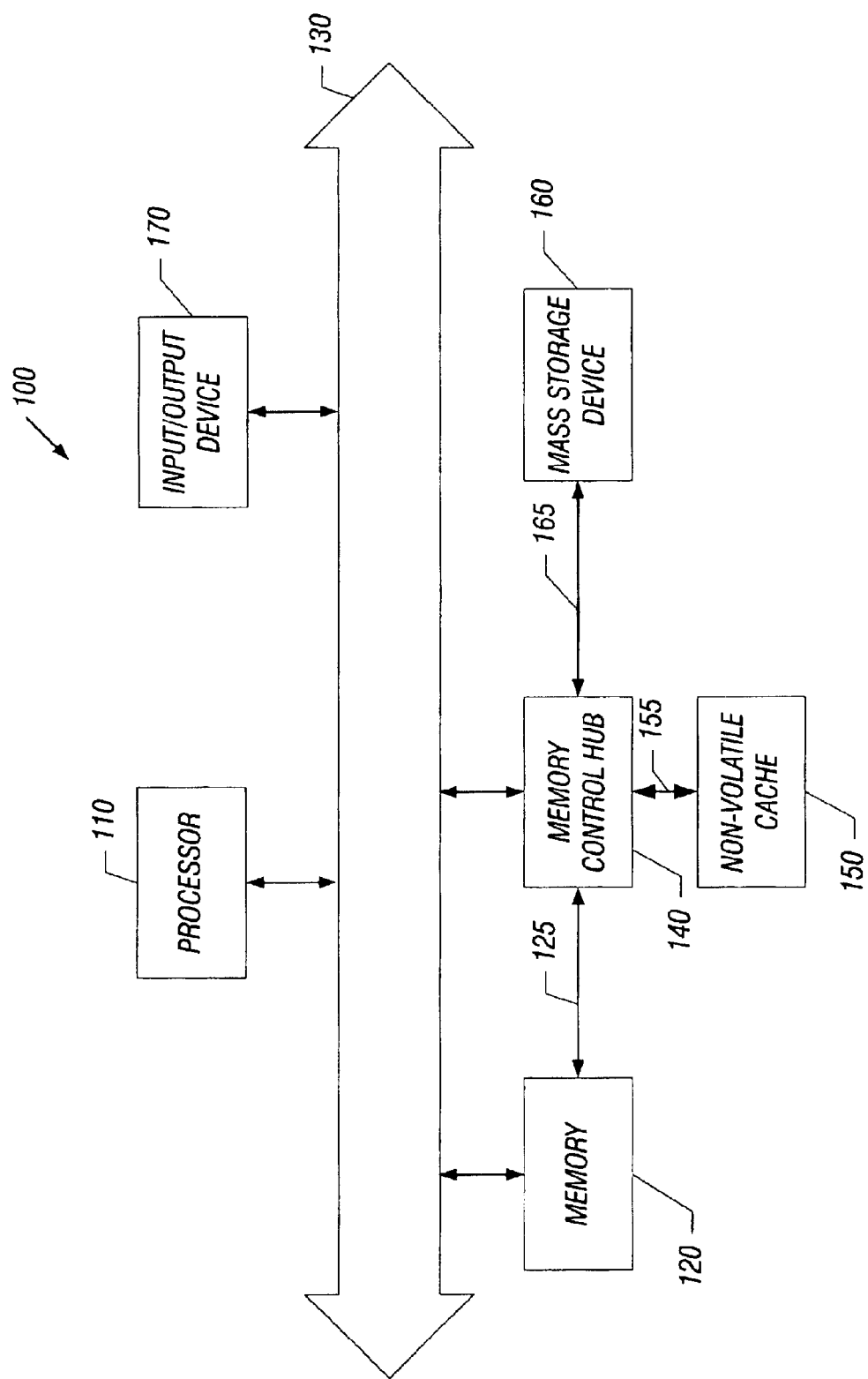
FIG. 1 is an exemplary system implementing the invention.

An exemplary embodiment of a system 100 implementing the principles of the invention is shown in FIG. 1. The system 100 includes a processor 110 coupled to a volatile memory 120 (hereinafter "memory") by a bus 130. In one embodiment, the memory 110 is a dynamic random-access-memory (DRAM). Also coupled to the bus 130, a memory control hub 140 controls the operations of the memory 120 via link 125, a non-volatile cache 150 (hereinafter "cache") via link 155 and a disk 160 via link 165. The memory control hub 140 includes a logic circuit (not shown) to manage the state or metadata information of memory 120 and the cache 150. Moreover, it will be appreciated by those skilled in the art that the memory control hub 140 may also include additional circuits to control caching functions such as read, write, update and invalidate operations. Finally, a number of input/output devices 170 such as a keyboard, mouse and/or display may be coupled to the bus 130.

Although the system 100 is shown as a system with a single processor, the invention may be implemented with multiple processors, in which additional processors would be coupled to the bus 130. In such case, each additional processor would share the cache 150 and memory 120 for writing data and/or instructions to and reading data and/or instructions from the same. Also, the system 100 shows the cache 150 to be a non-volatile storage media. However, the cache 150 may be a combination of volatile and non-volatile storage media. Similarly, the memory 120 may be one or any combination of a volatile storage media and a non-volatile storage media. Moreover, the cache 150 may be implemented into the system 100 as an add-in card such as a peripheral component interconnect (PCI) add-in. In still another embodiment, a portion of the disk 160 may be allocated as the cache 150. The invention will next be described below.

In one embodiment, the pinning of data is accomplished by adding a "pinned bit" to the metadata state for each line of data in the cache 150. Typically, the metadata required for correct operation is stored in both the memory 120 and the cache 150. Because the metadata is retained between system boots, such metadata will be called "persistent metadata." Persistent metadata may include flags to indicate whether a corresponding line of data in the cache 150 is valid and/or dirty and a tag to indicate the starting disk address for the data contained in a cache line. Metadata that is not required for correct operation, but improves performance is typically stored in a volatile storage media such as in the memory 120. Stored in a volatile storage media, such metadata is lost between system boots and will be called "non-persistent metadata." Non-persistent metadata may include the age of each cache line for use as the least recently used (LRU) information.

In one embodiment, the pinned bit is placed in the memory 120 as a non-persistent metadata. On system reboot, the necessary data pinned during initialization of the previous system boot would already be loaded into the cache 150. However, since the pinned bit is non-persistent, the pinning bit information is lost between system boots and a determination cannot be made as to whether a line of data was pinned or whether it was simply still in the cache 150. Therefore, during each initialization sequence, a pinning procedure is performed to pin data. Here, the need to improve system boot performance and the need to keep majority of space in the cache 150 free or replaceable during normal operation should be balanced. Hence, an upper bound on the amount of data pinned into the cache 150 is set to limit the amount of space occupied during normal execution.

Figure 2:
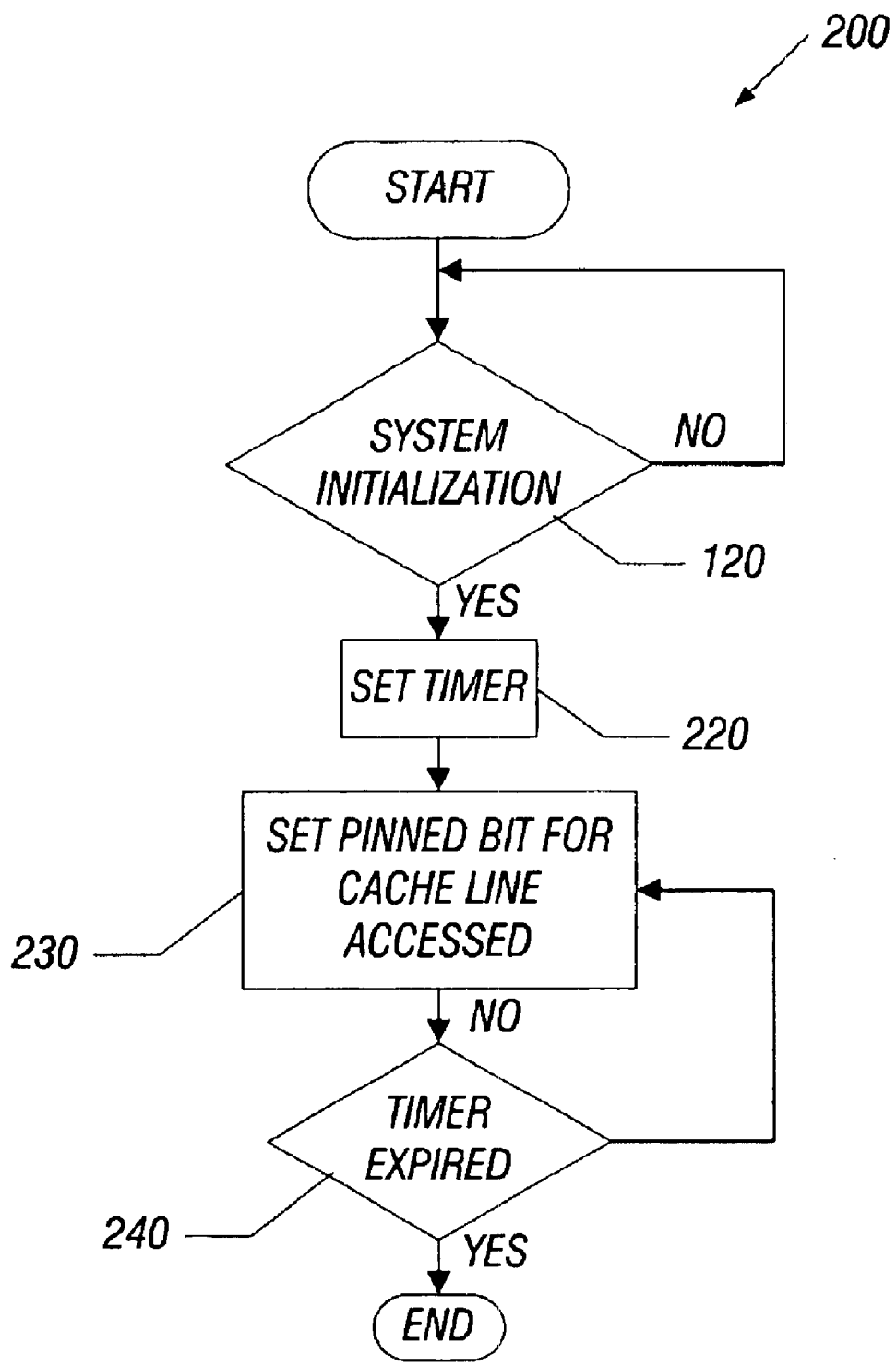
FIG. 2 shows an exemplary pinning procedure in accordance with an embodiment of the invention.

Although any method may be used to limit the amount of data pinned, FIG. 2 shows an exemplary pinning procedure 200 in accordance with one embodiment of the invention using a timer. Upon system initialization, a timer is set (block 220). Thereafter, the memory control hub 140 of FIG. 1 causes the pinned bit(s) corresponding to line(s) of data accessed to be set (block 230) until the timer expires (block 240). Data access here includes both reading and writing to the cache 150. Also, the timer can be set based on the needs of the system. However, in setting the timer, a generous amount of time should be reserved for the initialization sequence. The timer may be set to two minutes, for example, in a mass storage cache.

Figure 3:
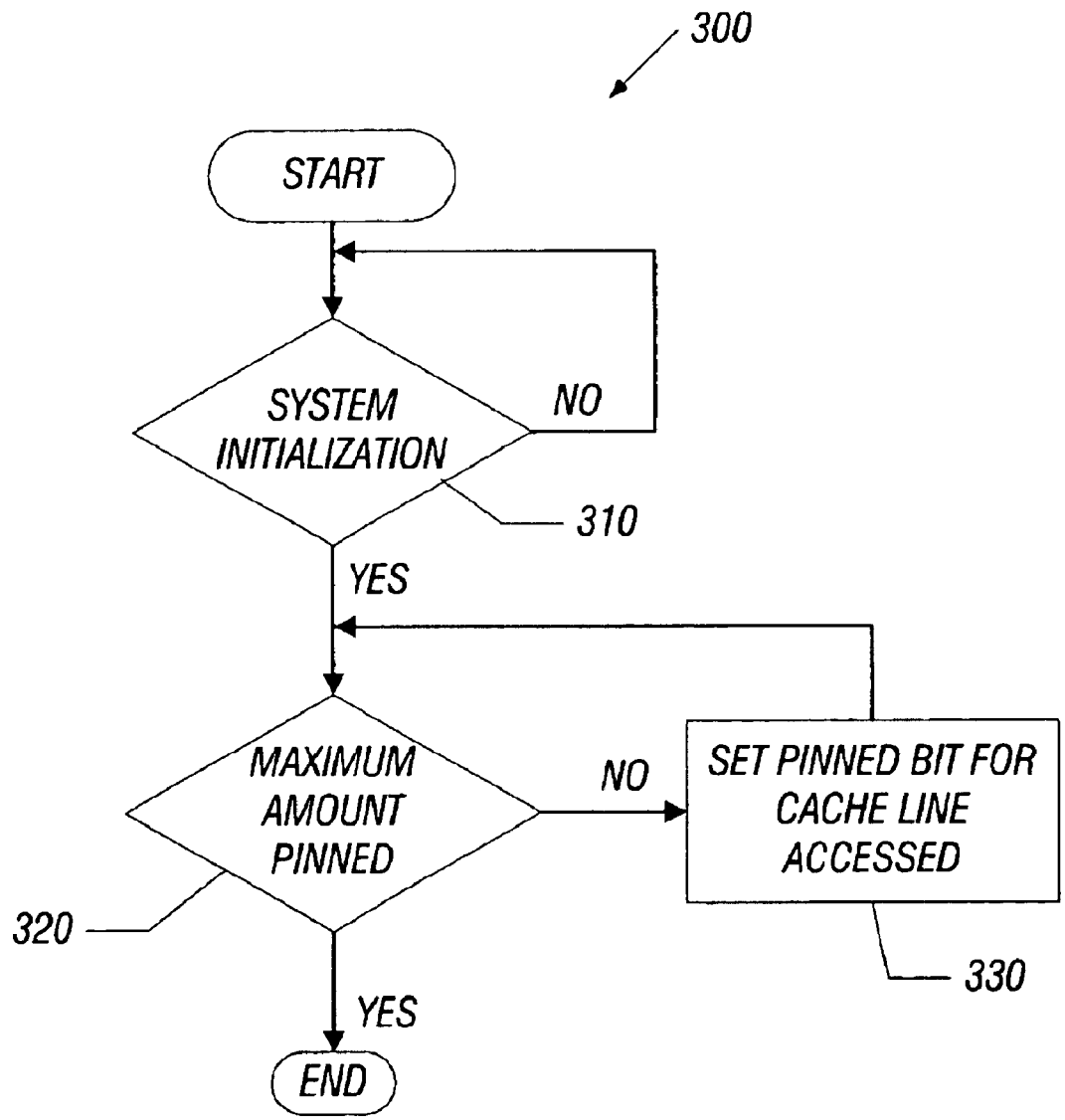
FIG. 3 shows an exemplary pinning procedure in accordance with a second embodiment of the invention.

FIG. 3 shows another pinning procedure 300 in accordance with a second embodiment of the invention allowing a maximum amount of data to be pinned. Upon system initialization, a determination is made whether a maximum amount of data have been pinned (block 320). Until the maximum amount is exceeded, the memory control hub 140 causes the pinned bit(s) corresponding to accessed line(s) of data to be set (blocks 320 and 330). Access here also includes both reading and writing to the cache 150. The maximum amount that can be pinned is given based on the needs of the system. Generally, the majority of lines of data in the cache 150 should be left "not pinned" for normal operation. For example, in mass storage caches with N cache associativity sets, the maximum amount may be set to one line per cache associativity set.

Figure 4:
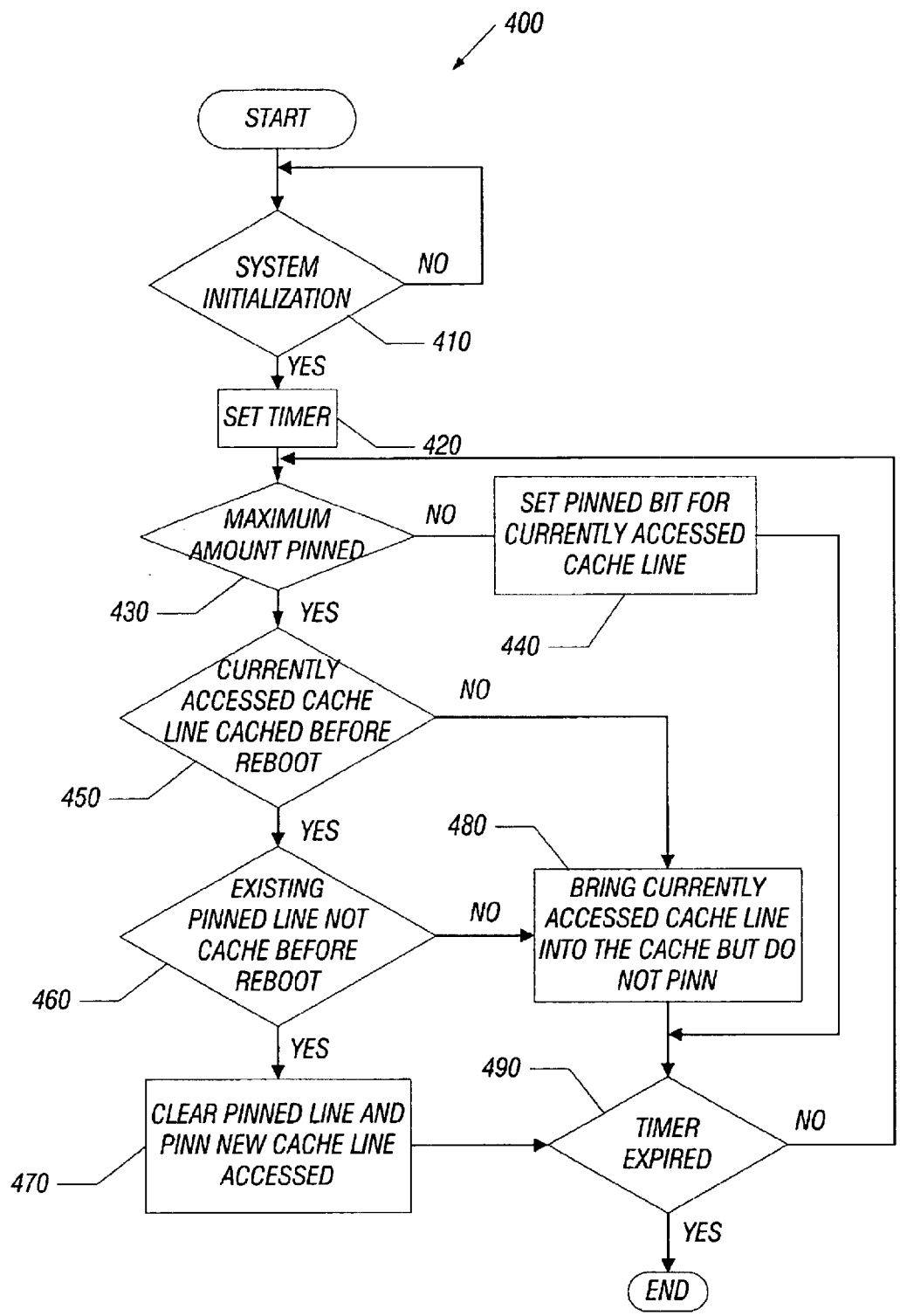
FIG. 4 shows an exemplary pinning procedure in accordance with a third embodiment of the invention.

FIG. 4 shows another pinning procedure 400 in accordance with a third embodiment of the invention using both a timer and a maximum amount of data to pin. In the pinning procedure 400, a "cacheBeforeReboot bit" is also added to the non-persistent metadata. The cacheBeforeReboot bit is set for any cache line that was present in the cache 150 before a system initialization. For example, these bits may be set as the persistent metadata is paged in from the cache 150 when a system is restarted.

Referring to FIG. 4, a timer is set upon a system initialization (block 420) and if the maximum amount has not been exceeded, the memory control hub 140 causes the pinned bit(s) corresponding to accessed cache line(s) to be set (blocks 430 and 440). Access here includes both reading and writing to the cache 150. If the maximum amount is exceeded, a determination is made whether a currently accessed cache line was cached before reboot (block 450) by checking the cacheBeforeReboot bit information. If the cacheBeforeReboot bit corresponding to the currently accessed cache line is set, a further determination is made whether there are pinned lines not cached before reboot (block 460) also by checking the corresponding cacheBeforeReboot bits.

If there is an existing pinned line, in the associativity set for example, not cached before reboot, the memory control hub 140 causes the pinned bit(s) corresponding to that existing line(s) to be cleared (or unpinned) and the pinned bit corresponding to the currently accessed cache line to be set (block 470). If it is determined either that the currently accessed cache line was not cached before reboot in block 450 or that there is no pinned line not cached before reboot in block 460, the memory control hub 140 causes the currently accessed cache line to be brought into the cache 150 but not pinned (block 470).

After blocks 440, 470 and 480, a determination is made whether the timer has expired (block 490). If the timer has expired, the pinning procedure 400 ends. Otherwise, the procedure returns to block 430 and repeats. Until the timer expires, data is selectively pinned into the cache 150 to improve the performance of the next reboot. At the same time, the number of lines that may be pinned is limited to allow the majority of space in the cache for normal operation.

In the pinning procedure 400, preference is given to pinning lines that were already in the cache by pinning lines which were cached before reboot. If there is more than one pinned line not cached before reboot in block 460, the pinned bit corresponding to the line with the latest age is cleared using the LRU information. Therefore, the pinning procedure 400 may also give preference to lines with earlier times in order to reflect the true initialization sequence rather than possible early user activity. Furthermore, as in the pinning procedures 200 and 300, the timer should be set such that a generous amount of time is reserved for the initialization sequence and the maximum amount to pin should be set such that the majority of each set in the cache is preserved for normal operation. For example, the timer may be set to one minute and the maximum number may be set to one line per set for mass storage caches.

Once the timer expires or the maximum amount has been pinned in the pinning procedures 200–400, any further accesses will not evict the cache lines with the corresponding pinned bits set. Also, the memory control hub 140 of FIG. 1 may further include a logic circuit to clear the pinned bits of one or more cache lines. The clearing of multiple cache lines would allow different collections of cache lines to be pinned, for example, if a new operating system is loaded on the system.

By pinning data into a non-volatile cache during system initialization, the time needed for a system initialization can be reduced. This is especially significant in mass storage caches. In another embodiment, however, the pinned bit may be stored in a non-volatile storage media such that the information is retained between boots. For example, the pinned bit may be included into the metadata stored in the cache 150 or to the memory 120, if the memory 120 includes a non-volatile storage media. In such case, the pinning procedure during each system initialization would not be necessary as the pinning bit information is retained between system boots. Moreover, although the invention has been described with reference to a system initialization, the teachings of the invention is not limited to pinning data necessary during system initialization and can be applied in any operation which require repeated use of data in a non-volatile cache.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method to reduce initialization time of a system, comprising:

storing at least a portion of the data accessed during initialization of the system in a non-volatile cache memory of the system; and pinning at least a portion of the data stored in the non-volatile cache memory, wherein the pinning is performed during initialization of the system.

2. The method of claim 1, wherein storing comprises storing the data in a mass storage non-volatile cache memory.

3. The method of claim 1, wherein pinning comprises pinning the portion of data necessary for a system initialization.

4. The method of claim 1, wherein pinning comprises:

storing metadata corresponding to the data stored in the non-volatile cache memory; and setting a state in the metadata to indicate that a corresponding line of data is pinned.

5. The method of claim 4, wherein storing the metadata comprises storing the metadata in a second memory.

6. The method of claim 4, wherein storing the metadata comprises storing the metadata in a volatile storage media.

7. A metadata stored in a system comprising:

a first state to indicate a least recently used information of a corresponding line of initialization data in a non-volatile memory of the system; and a second state to indicate whether a corresponding line of initialization data in the non-volatile memory is pinned.

8. The metadata of claim 7, further comprising:

a third state to indicate whether a corresponding line of initialization data in the non-volatile memory was present before a system initialization of the system.

9. The metadata of claim 7, wherein the metadata is stored in a volatile storage media, wherein the second state is set during initialization of the system.

10. A system comprising:

a cache including a first storage media to store cache data accessed during initialization of the system, the first storage media being a non-volatile storage media; and a second storage media to store metadata for the cache data stored in the first storage media, the metadata including a state to indicate whether a corresponding line of data is pinned, wherein the state is set during initialization of the system.

11. The system of claim 10, wherein the cache is a mass storage cache.

12. The system of claim 10, wherein the second storage media is a volatile storage media.

13. The system of claim 10, wherein the second storage media is included in the cache.

14. The system of claim 10, wherein the cache is implemented as an add-in card.

15. A method comprising:

accessing a first memory during a system initialization, the first memory being a cache; and pinning data accessed during the system initialization in the first memory, wherein the pinning occurs during the system initialization.

16. The method of claim 15, wherein the cache is a mass storage non-volatile cache.

17. The method of claim 15, further comprising:

limiting the pinning of data during the system initialization.

18. The method of claim 15, wherein the pinning comprises:

storing metadata for the data stored in the first memory, the metadata including a first state to indicate whether a corresponding line of data is pinned; and setting a first state corresponding to the accessed data to indicate that the accessed data is pinned.

19. The method of claim 18, wherein the pinning of data further comprises:

setting a timer upon the system initialization; and setting a first state corresponding to the accessed data until the timer expires.

20. The method of claim 18, wherein the pinning of data further comprises:

setting a maximum amount of data to pin; and setting a first state corresponding to the accessed data until the maximum amount is exceeded.

21. The method of claim 18, wherein the metadata further includes a second state; and wherein the pinning of data further comprises:

setting a second state for data that was present before system initialization, the setting of the second state to indicate that a corresponding data was present before the system initialization;

setting a timer upon the system initialization;

setting a maximum amount of data to pin;

setting a first state corresponding to the accessed data if the maximum amount is not exceeded and if the timer has not expired; and otherwise clearing a first state corresponding to a pinned data and setting a first state corresponding to the accessed data if the second state corresponding to the pinned data is not set and the pinned data corresponding to the accessed data is set, and if the timer has not expired.

22. The method of claim 21, wherein the metadata further includes a third state to indicate the age of a corresponding line of data and the clearing of a first state comprises:
clearing the latest line of data if there is more than one line of pinned data whose second state is not set.

23. A system comprising:
a cache including a first storage media to access during a system initialization, the first storage media being non-volatile;
a second storage media to store metadata for data accessed during the system initialization, the metadata including a first state; and
a memory control hub to cause the first state to be set for data accessed during the system initialization, the setting of the first state to occur during the system initialization and to indicate that a corresponding line of data is pinned.

24. The system of claim 23, wherein the metadata further includes a second state; and wherein the memory control hub causes the second state to be set for data present before the system initialization, the setting of the second state to indicate that a corresponding line of data was present before the system initialization.

25. The system of claim 23, wherein the cache is a mass storage cache.

26. The system of claim 23, wherein the memory control hub limits the amount of data pinned.

27. The system of claim 23, wherein the second storage media is a volatile storage media.

28. The system of claim 23, wherein the second storage media is included in the cache.

29. The system of claim 23, wherein the cache is implemented as an add-in card.

30. A program loaded into a computer readable media comprising:
a first group of computer instructions to access data in a non-volatile cache of a system;
a second group of computer instructions to pin data accessed in the non-volatile cache, during initialization of the system.

31. The program of claim 30, wherein the second group of computer instructions further includes computer instructions to limit the amount of data pinned.

32. A method to reduce initialization time of a system, comprising:
marking data stored in a non-volatile cache memory to prevent eviction of the data, wherein the marking occurs during initialization of the system.

33. The method of claim 32, wherein marking comprises marking data stored in a mass storage non-volatile disk cache memory.

34. The method of claim 32, wherein marking comprises marking data accessed during initialization of the system and further comprising storing the data accessed during initialization in the non-volatile cache memory.

35. The method of claim 32, wherein marking includes storing metadata corresponding to the data in a second memory different than the non-volatile cache memory, wherein the metadata includes a pinned bit that is set by a memory control hub to prevent eviction of the corresponding data stored in the non-volatile cache memory.

36. The method of claim 32, further comprising limiting the amount of data that is marked using either a timer or a maximum count.

37. The method of claim 32, wherein marking comprises setting at least one bit to indicate that the data is pinned.

38. The method of claim 37, further comprising storing the at least one bit in a volatile memory.

39. The method of claim 37, further comprising storing the at least one bit in the non-volatile cache memory, wherein the non-volatile cache memory is a non-volatile disk cache memory.

40. The method of claim 32, wherein the marking occurs during each initialization of the system.

* * * * *